(12) United States Patent
Sakurai et al.

(10) Patent No.: US 10,024,609 B2
(45) Date of Patent: Jul. 17, 2018

(54) STEEL COVERING LAYER AND METHOD OF SURFACE TREATMENT OF HEAT TRANSFER TUBE

(71) Applicant: MITSUBISHI HEAVY INDUSTRIES, LTD., Tokyo (JP)

(72) Inventors: Hideaki Sakurai, Tokyo (JP); Seiji Kagawa, Tokyo (JP); Tsuyoshi Miyachi, Tokyo (JP); Takuya Okamoto, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 645 days.

(21) Appl. No.: 14/380,895

(22) PCT Filed: Feb. 7, 2013

(86) PCT No.: PCT/JP2013/052881
§ 371 (c)(1),
(2) Date: Aug. 25, 2014

(87) PCT Pub. No.: WO2013/129064
PCT Pub. Date: Sep. 6, 2013

(65) Prior Publication Data
US 2015/0027671 A1   Jan. 29, 2015

(30) Foreign Application Priority Data
Feb. 27, 2012  (JP) ................................. 2012-040715

(51) Int. Cl.
*F28F 19/02* (2006.01)
*B32B 15/08* (2006.01)
(Continued)

(52) U.S. Cl.
CPC ................ *F28F 19/02* (2013.01); *B32B 1/08* (2013.01); *B32B 15/08* (2013.01); *F28F 19/04* (2013.01)

(58) Field of Classification Search
CPC ........... F28F 19/02; F28F 19/04; B32B 15/08; B32B 1/08
(Continued)

(56) References Cited

U.S. PATENT DOCUMENTS 3,819,328 A * 6/1974 Go ........................... C10G 7/10
203/7
4,344,386 A * 8/1982 Black .................... F24H 1/0045
122/18.4
(Continued)

FOREIGN PATENT DOCUMENTS

CN 101501437 A 8/2009
CN 101568793 A 10/2009
(Continued)

OTHER PUBLICATIONS

Japanese Office Action dated Oct. 27, 2015 issued in counterpart Japanese patent application No. 2012-040715, with English translation. (10 pages).
(Continued)

*Primary Examiner* — Keith Raymond
*Assistant Examiner* — Joel Attey
(74) *Attorney, Agent, or Firm* — Westerman, Hattori, Daniels & Adrian, LLP

(57) ABSTRACT

A steel covering layer according to the present invention includes a surface layer formed of a low surface energy material and formed on the surface of a heat transfer tube.

8 Claims, 3 Drawing Sheets

(51) Int. Cl.
    *B32B 1/08*     (2006.01)
    *F28F 19/04*     (2006.01)

(58) Field of Classification Search
    USPC .......................... 165/133, 134.1; 427/397.7
    See application file for complete search history.

(56) References Cited

U.S. PATENT DOCUMENTS

| | | | |
|---|---|---|---|
| 5,260,455 A * | 11/1993 | Eckberg | C07F 7/08 |
| | | | 522/25 |
| 6,248,455 B1 * | 6/2001 | Adams | B32B 15/08 |
| | | | 428/626 |
| 6,387,538 B1 | 5/2002 | Lee et al. | |
| 6,403,164 B1 * | 6/2002 | Jonschker | C09D 4/00 |
| | | | 427/387 |
| 8,043,774 B2 * | 10/2011 | Zhang | G03G 5/142 |
| | | | 428/331 |
| 2005/0082051 A1 | 4/2005 | Hashimoto et al. | |
| 2008/0073063 A1 | 3/2008 | Clavenna et al. | |
| 2011/0020604 A1 * | 1/2011 | Zheng | B82Y 30/00 |
| | | | 428/148 |

FOREIGN PATENT DOCUMENTS

| | | |
|---|---|---|
| JP | 59-087594 U | 6/1964 |
| JP | 58-221342 A | 12/1983 |
| JP | 60-164167 A | 8/1985 |
| JP | 04-000190 A | 1/1992 |
| JP | 5-133695 A | 5/1993 |
| JP | 7-63495 A | 3/1995 |
| JP | 2000-329411 A | 11/2000 |
| JP | 2001-158980 A | 6/2001 |
| JP | 2001-330394 A | 11/2001 |
| JP | 2002-098496 A | 4/2002 |
| JP | 2002-105676 A | 4/2002 |
| JP | 2003-184659 A | 7/2003 |
| JP | 2003-535221 A | 11/2003 |
| JP | 2004-283699 A | 10/2004 |
| JP | 2005-90833 A | 4/2005 |
| JP | 2005-98666 A | 4/2005 |
| JP | 2005-133981 A | 5/2005 |
| JP | 2006-125659 A | 5/2006 |
| JP | 2007-038626 A | 2/2007 |
| JP | 2007-057115 A | 3/2007 |
| JP | 2007-113850 A | 5/2007 |
| JP | 2007-163115 A | 6/2007 |
| JP | 2008-089230 A | 4/2008 |
| JP | 2008-202133 A | 9/2008 |
| JP | 2009-277818 A | 11/2009 |
| JP | 2009-541702 A | 11/2009 |
| JP | 2010-117067 A | 5/2010 |
| JP | 2011-174634 A | 9/2011 |
| WO | 2006/082906 A1 | 8/2006 |
| WO | 2011/133000 A2 | 10/2011 |

OTHER PUBLICATIONS

Office Action dated Jun. 7, 2016, issued in counterpart Japanese Patent Application No. 2012-040715, with English translation. (8 pages).
Extended (Supplementary) European Search Report dated Jun. 10, 2016, issued in counterpart European Patent Application No. 13754631.3. (8 pages).
International Search Report dated Apr. 2, 2013 issued in corresponding application No. PCT/JP2013/052881.
Office Action dated May 12, 2015, issued in counterpart Japanese application No. 2012-040715 (w/English translation) (7 pages).
Office Action dated May 26, 2015 issued in counterpart Taiwanese application No. 102106083 (w/English translation) (12 pages).
Office Action dated Jun. 15, 2015 issued in counterpart Chinese application No. 201380010660.1 (w/English translation) (19 pages).
Notification of Grant of Invention Patent dated Feb. 4, 2016, issued in counterpart Chinese Patent Application No. 201380010660.1, with English translation. (3 pages).
Notification of Completion of Formalities for Registration dated Feb. 4, 2016, issued in counterpart Chinese Patent Application No. 201380010660.1, with English translation. (2 pages).
Decision of a Patent Grant dated Jan. 10, 2017, issued in counterpart Japanese Patent Application No. 2012-040715, with machine translation. (5 pages).
English Translation of Written Opinion dated Apr. 2, 2013, issued in counterpart International Application No. PCT/JP2013/052881 (4 pages).

* cited by examiner

STEEL COVERING LAYER AND METHOD OF SURFACE TREATMENT OF HEAT TRANSFER TUBE

FIELD

The present invention relates to a steel covering layer and a method of surface treatment of a heat transfer tube, used for treating the surface of a pipe in a heat exchanger.

BACKGROUND

For a great number of heat exchanging tubes (heat transfer tubes) provided in a shell (body) of a heat exchanger, carbon steel is mainly used in view of heat transfer efficiency and material cost. There are a bare-type and a fin-type for heat transfer tubes. The fin-type is used for a heat transfer tube since the fin-type has higher heat transfer efficiency.

The heat exchanging performance of the heat exchanger is deteriorated by ash and soot adhering to and depositing on the heat transfer surface of the heat transfer tube during continuous operation. When ash and soot included in flue gas adhere to and deposit on the surface of the heat transfer tube, the ash and soot form a bridge in a gap between heat transfer tubes. The bridge narrows the flue gas passage between the heat transfer tubes, thereby obstructing the flow of the flue gas flowing through the group of heat transfer tubes, resulting in the rise of pressure loss of the flue gas. Further, moisture (mist) in the flue gas adheres to the beat transfer tube, wetting the heat transfer tube, which is one of causes of corrosion.

There are methods for removing the ash and soot adhering to the heat transfer tube such as a method of shaking off the ash and soot adhering to the heat transfer tube by the impact of a fallen steel ball hitting the heat transfer tube, a method of forcibly burning the soot adhering to and depositing on the outer circumferential surface of the heat transfer tube using a heating wire attached to the outer circumferential surface of the heat transfer tube, and a method of removing the ash and soot adhering to the surface of the heat transfer tube by blowing steam or air by a soot blower (e.g., see Patent Literatures 1 to 3).

There are methods of preventing corrosion of a heat transfer tube by covering the heat transfer tube using a resin tube or a method of applying a coating on the heat transfer surface of the heat transfer tube (e.g., see Patent Literature 4).

CITATION LIST

Patent Literature

Patent Literature 1: Japanese Laid-open Patent Publication No. 5-133695
Patent Literature 2: Japanese Laid-open Patent Publication No. 7-63495
Patent Literature 3: Japanese Laid-open Patent Publication No. 2010-117067
Patent Literature 4: Japanese Laid-open Patent Publication No. 2005-98666

SUMMARY

Technical Problem

However, in the method of removing the ash and soot adhering to the heat transfer tube using the impact made by a fallen steel ball, the steel ball might be stuck between heat transfer tubes. In the methods using a heating wire or a soot blower, an additional apparatus for arranging the heating wire or the soot blower is necessary, resulting in the rise in cost. Further, using only a soot blower is not enough to remove the ash and soot tightly adhering to the heat transfer tube.

Since a resin tube is used so as to cover the heat transfer tube, a resin tube cannot be used for preventing corrosion of a fin-type heat transfer tube, although the fin-type heat transfer tube has high heat transfer efficiency. Besides, when coating is applied to the heat transfer surface of the heat transfer tube, a thick coating layer deteriorates heat transfer efficiency.

The present invention is made with regard to the problem mentioned above. The object of the present invention is to provide a steel covering layer and a method of surface treatment of a heat transfer tube, which suppress adhering of ash, soot, or the like included in flue gas to the heat transfer surface of the heat transfer tube.

Solution to Problem

According to a first aspect of the present invention if order to solve the above problems, there is provided a steel covering layer including a surface layer formed of a low surface energy material and formed on a surface of a heat transfer tube.

According to a second aspect of the present invention, there is provided the steel covering layer according to the first aspect further including a binder layer formed of an inorganic glass-based material and formed between the heat transfer tube and the surface layer.

According to a third aspect of the present invention, there is provided the steel covering layer according to the second aspect, wherein a thickness of the binder layer is 10 µm or less.

According to a fourth aspect of the present invention, there is provided the steel covering layer according to any one of the first to third aspects, wherein the low surface energy material includes at least one of a $(CH_4)_3$—Si structure, a $F_3C$ structure, and a silane coupling reactive group.

According to a fifth aspect of the present invention, there is provided the steel covering layer according to any one of the first to fourth aspects, wherein a thickness of the surface layer is 1 µm or less.

According to a sixth aspect of the present invention, there is provided a method of surface treatment of a heat transfer tube including: applying a solution including a low surface energy material to a surface of a heat transfer tube; and performing heat treatment to cure the solution to form a surface layer.

According to a seventh aspect of the present invention, there is provided the method of surface treatment of a heat transfer tube according to the sixth aspect, wherein a binder layer formed of an inorganic glass-based material is formed between the heat transfer tube and the surface layer.

According to an eighth aspect of the present invention, there is provided the method of surface treatment of a heat transfer tube according to the seventh aspect, wherein a thickness of the binder layer is 10 µm or less.

According to a ninth aspect of the present invention, there is provided the method of surface treatment of a heat transfer tube according to any one of the sixth to eighth aspects, wherein the low surface energy material includes at least one of a $(CH_4)_3$—Si structure, a $F_3C$ structure, and a silane coupling reactive group.

According to a tenth aspect of the present invention, there is provided the method of surface treatment of a heat transfer tube according to any one of the sixth to ninth aspects, wherein. a thickness of the surface layer is 1 µm or less.

Advantageous Effects of Invention

According to the present invention, adhering of ash, soot, or the like included in flue gas to the heat transfer surface of a heat transfer tube can be suppressed.

DESCRIPTION OF EMBODIMENTS

Figure 1:
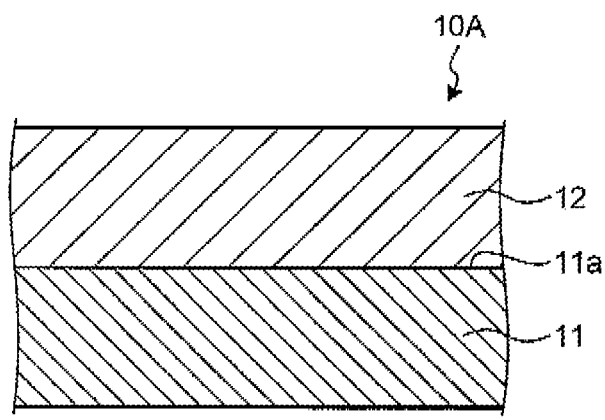
FIG. 1 is a schematic view illustrating a steel covering layer according to a first embodiment of the present invention.

The present invention will be described below in detail referring to the drawings. Note that, the present invention is not limited to the embodiment described below. The component of the embodiment includes a component which is included within the meaning and range of equivalency, that is, a component which those skilled in the art can easily conceive or a component substantially the same as that of the embodiment. Further, components disclosed in the embodiment can suitably be used in combination.

First Embodiment

The case in which a steel covering layer according to a first embodiment of the present invention is applied to a great number of heat exchanging tubes (heat transfer tubes) provided in a shell (body) of a heat exchanger will be described referring to the drawing. FIG. 1 is a schematic view illustrating a steel covering layer according to the first embodiment of the present invention. As illustrated in FIG. 1, a steel covering layer 10A according to the embodiment is formed as a surface layer 12 on a surface 11a of a heat transfer tube 11.

The surface layer 12 is formed of a low surface energy material. For example, silicone resin compositions, fluoro resin compositions may be used as the low surface energy material. The silicone resin composition preferably has a water-repellent or water-and-oil-repellent (hereinafter referred to as "water/oil-repellent") $(CH_4)_3$—Si structure. The fluoro resin composition preferably has $F_3C$ structure as a terminal substituent. Specifically, for example, silicone resins (produced by Shin-Etsu Silicone Co., Ltd.), Unidyne (produced by Daikin Industries, Ltd.), Fluoro Surf (produced by FluoroTechnology Co., Ltd.), or Lumiflon (produced by Asahi Glass Co., Ltd.) may be used. The surface layer 12 may be formed of one of or a plurality of low surface energy materials mentioned above.

By forming the surface layer 12 using silicone resin compositions or fluoro resin compositions mentioned above, the surface energy of the interface can be lowered, suppressing adhesion of ash, soot, or the like and thereby suppressing contamination of the surface of the surface layer 12. Further, even when ash and soot adhere to the surface of the surface layer 12, the surface layer 12 is enhanced with the effect of separating the ash and soot.

Figure 2:
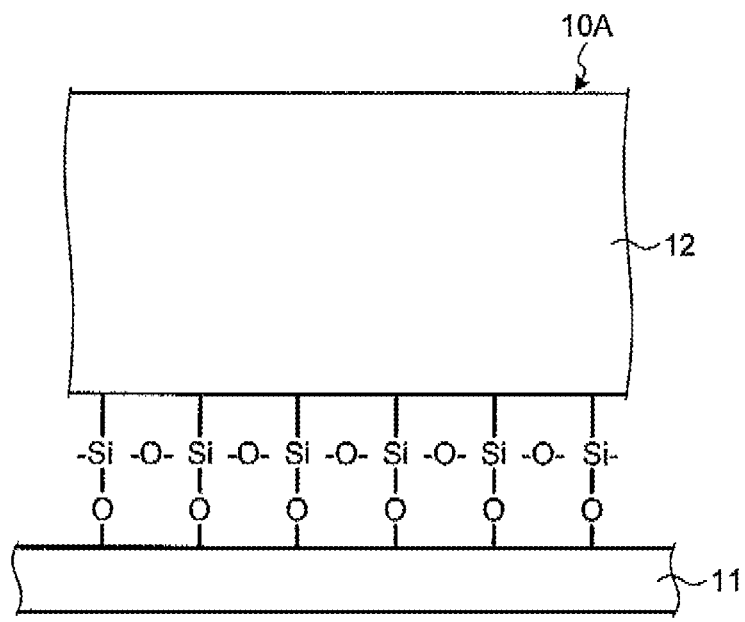
FIG. 2 is an explanatory drawing illustrating a coupling status of a silane coupling reactive group and a heat transfer surface of a heat transfer tube.

The surface layer 12 preferably includes in a molecule thereof, a silane coupling reactive group {(RO)nSi—} for coupling with the base material by covalent bond. FIG. 2 is an explanatory drawing illustrating a coupling status of the surface layer 12, including the silane coupling reactive group, and the surface of the heat transfer tube 11. As illustrated in FIG. 2, the silane coupling reactive group {(RO)nSi—} included in the molecule forms a covalent bond (—O—Si—O—) by dehydration reaction with an OH group on the surface of the heat transfer tube 11. In this manner, a bridging layer is formed between the surface layer 12 and the surface of the heat transfer tube 11, strongly bonding the surface of the heat transfer tube 11 and the surface layer 12.

The low surface energy material is preferably in a form of liquid which can be coated by spraying, painting, dipping, or the like. By applying a solution including the low surface energy material and then heat treating and drying the solution, the surface layer 12 is obtained.

As mentioned above, an organic material such as silicone resin compositions and fluoro resin compositions is used as a raw material of the surface layer 12, so that the organic material can easily be applied to an object such as the heat transfer tube 11 to form a thin film. Further, by simply applying an organic material such as silicone resin compositions and fluoro resin compositions, the surface layer 12 can be reformed on the heat transfer surface of the heat transfer tube 11. So that even when the surface layer 12 has degraded, the surface layer 12 can easily be reformed by applying the raw material for forming the surface layer 12 on the heat transfer tube 11.

The surface layer 12 is preferably a monomolecular film with the thickness ranging from 10 mm to 1 µm. Specifically, for example, Fluoro Surf produced by FluoroTechnology Co., Ltd is used as a monomolecular film. The monomolecular film has a molecular structure in which a reactive group is at one end and a water/oil-repellent group is at the other end, which allows forming of a monomolecular film between heat transfer surfaces of heat transfer tubes. By forming the surface layer 12 with a single molecular film, a coating can be provided on the heat transfer tube 11 without deteriorating thermal conductivity.

Figure 3:
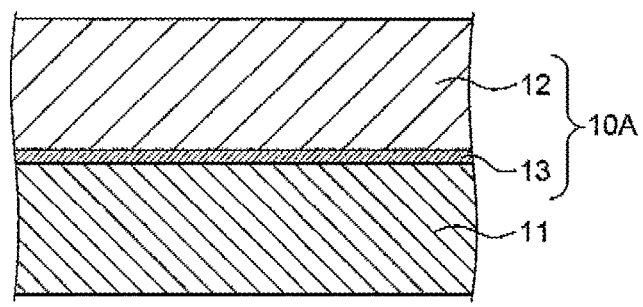
FIG. 3 is a schematic view illustrating another configuration of the steel covering layer.

Further, the steel covering layer 10A according to the embodiment is formed simply as the surface layer 12 on the surface of the heat transfer tube 11. However, it is not limited to the configuration. As illustrated in FIG. 3, the steel covering layer 10A according to the embodiment may be configured to have a primer layer 13 provided on the surface, opposing the heat transfer tube 11, of the surface layer 12. By providing the primer layer 13 on the surface, opposing the heat transfer tube 11, of the surface layer 12, the contact between the heat transfer tube 11 and the surface layer 12 can further tightly be provided and adhesion between the surface layer 12 and the heat transfer tube 11 can be improved.

As described above, since the steel covering layer 10A according to the embodiment is formed as the surface layer 12, adhesion of ash, soot, or the like to the surface of the steel covering layer 10A according to the embodiment can be suppressed. Further, by providing the primer layer 13 on the surface, opposing the heat transfer tube 11 side, of the surface layer 12, the adhesion of the surface layer 12 to the surface of the heat transfer tube 11 can further be improved.

Figure 4:
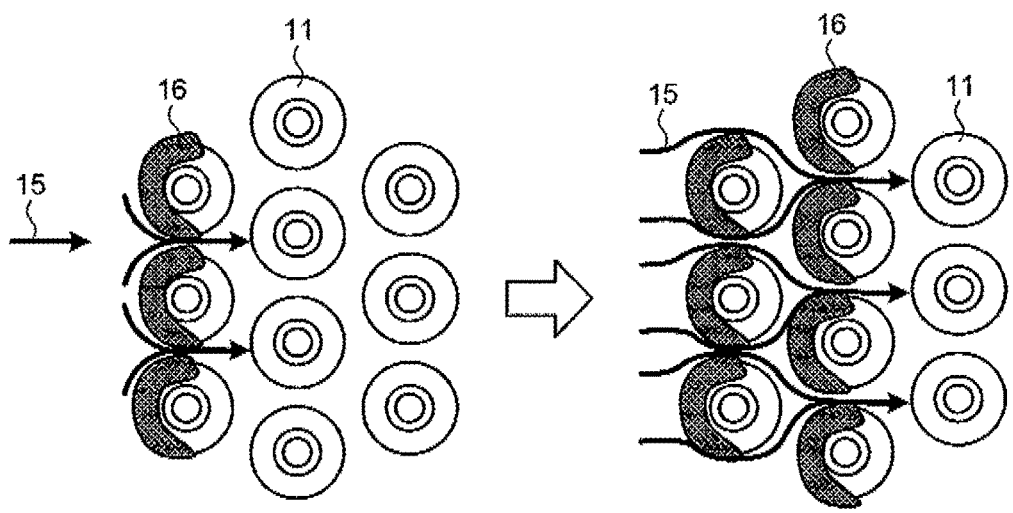
FIG. 4 is an explanatory drawing illustrating an example of ash and soot in flue gas adhering to a heat transfer tube.

Since adhesion of ash, soot, or the like to the surface of the heat transfer tube 11 can be suppressed, the heat transfer tube 11 can stably maintain the heat transfer efficiency. As illustrated in FIG. 4, when a great number of heat transfer tubes provided in a shell of a heat exchanger are used without any treatment as in the prior art, the ash and soot included in flue gas 15 passing through the heat transfer tubes 11 in the first stage adhere to the heat transfer tube 11 in the first stage and harden to form a deposit 16. This narrows the flow passage between the heat transfer tubes 11 in the first stage, and thereby the flue gas 15 including ash and soot is likely to be concentrated to flow toward the front side, opposing the gas flow, of the heat transfer tube 11 in the second stage. When a large amount of ash and soot included in the flue gas 15 adhere to the front side, opposing the gas flow, of the heat transfer tube 11 in the forward stage, the flue gas 15 including ash and soot is likely to be concentrated to flow toward the front side, opposing the gas flow, of the heat transfer tubes 11 provided in downstream stages. Therefore, the ash and soot included in the flue gas 15 similarly adhere to the heat transfer tube 11 provided in the downstream stage causing deterioration in heat transfer efficiency, resulting in deterioration in the heat exchanging efficiency of the whole heat exchanger.

Contrarily, when the steel covering layer 10A according to the embodiment is provided on the surface of the heat transfer tube 11, adhesion of ash, soot, or the like to the surface of the steel covering layer 10A according to the embodiment can be suppressed, thereby suppressing deterioration in heat transfer efficiency of the heat transfer tube 11. In this manner, the deterioration in heat exchanging efficiency of the whole heat exchanger can be suppressed, enabling stable operation of the heat exchanger.

Second Embodiment

Figure 5:
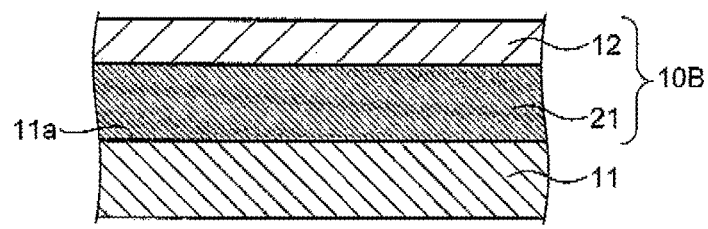
FIG. 5 is a schematic view illustrating a steel covering layer according to a second embodiment of the present invention.

A steel covering layer according to a second embodiment of the present invention will be described referring to the drawings. FIG. 5 is the schematic view illustrating a steel covering layer according to the second embodiment of the present invention. As illustrated in FIG. 5, a steel covering layer 10B according to the embodiment includes the surface layer 12 and a binder layer 21. The binder layer 21 is formed on the surface lie of the heat transfer tube 11 and the surface layer 12 is formed on the binder layer 21.

Figure 6:
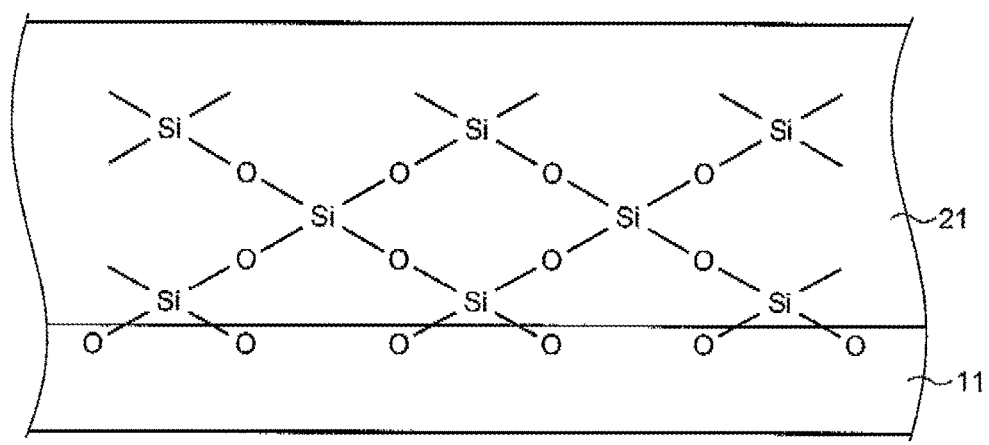
FIG. 6 is an explanatory drawing illustrating a coupling status of a binder layer and a heat transfer surface of a heat transfer tube.

The binder layer 21 is formed between the heat transfer tube 11 and the surface layer 12, forming a fine film. The binder layer 21 is formed of an inorganic material having high reactivity with the surface layer 12. As an inorganic material, a silane coupling agent, a glass coating agent composed of a Si—O structure may be used. Specifically, a silane coupling agent produced by Shin-Etsu Silicone Co., Ltd. may be used. The glass coating agent having a Si—O structure forms a covalent bond (—O—Si—O—) by dehydration reaction with an OH group on the surface of the heat transfer tube 11 which is a base material as illustrated in FIG. 6. Particularly, Crystal coating (produced by Nikko Co., Ltd.), Crystal X (produced by S-MACH Engineering Corporation), AQUAMICA based on perhydroxipolysilazane (produced by AZ Electro Materials Co., Ltd.), and TGA (produced by APOLLORINK Inc.) may be used as the glass coating agent.

The binder layer 21 having a fine structure and formed in a film of inorganic material with high reactivity with the surface layer 12 can suppress the water from making contact with the heat transfer tube 11 thereby suppressing corrosion.

The thickness of the binder layer 21 is preferably in the range from 5 µm to 100 µm, more preferably, from 7 µm to 50 µm, and furthermore preferably, from 10 µm to 30 µm.

Similarly to the surface layer 12, the inorganic material is preferably in a form of liquid which can be coated by spraying, painting, dipping, or the like. The inorganic material cures by heating, absorbing of moisture, and effect of catalyst, and thereby the binder layer 21 is obtained.

As mentioned above, the organic material including the inorganic material is used as the raw material of the binder layer 21, so that, similarly to the surface layer 12, the raw material can easily be applied to an object such as the heat transfer tube 11 to form a thin film. Further, by simply applying the organic material mentioned above, the binder layer 21 can be reformed on the surface of the heat transfer tube 11. So that when the binder layer 21 has degraded, the binder layer 21 can easily be reformed by applying the raw material, for forming the binder layer 21 to the heat transfer tube 11.

The steel covering layer 10B according to the embodiment has a two-layer structure composed of the surface layer 12 and the binder layer 21. For example, the combination of the surface layer 12 and the binder layer 21 may preferably be TGA, as the material forming the surface layer 12, and Fluoro Surf, as the material forming the binder layer 21. Since both TGA used as the material to form the surface layer 12 and Fluoro Surf used as the material to form the binder layer 21 can be formed in a thin film, each of the surface layer 12 and the binder layer 21 can be formed to have thicknesses of 10 µm or less.

Exemplary Experiment

Now the result of evaluating the reducing effect of adhesion of ash, soot, or the like and corrosion resistance of the steel covering layer 10B according to the embodiment will be described. A first exemplary experiment shows the test result of adhesion of ash and soot and corrosion resistance of the base material for a test piece in which a fluoro resin composition (Fluoro Surf produced by FluoroTechnology Co., Ltd.) is used as the surface layer 12 and a fluoro resin composition (TGA produced by APOLLORINK Inc.) is used as the binder layer 21 of the steel covering layer 10B according to the embodiment for the base material (metal plate). A first comparative example shows the test result of adhesion of ash, soot, or the like and corrosion resistance of the base material for a test piece which is simply a base material.

The adhesion of ash, soot, or the like is evaluated by a releasing force of a piece of fly-ash adhered. to the test piece. The corrosion resistance of the base material is evaluated by the elapsed time from dipping the test piece in a sulfuric acid aqueous solution having ph of 2 until corrosion occurs on the test piece. The test results of the first exemplary experiment and the first comparative example are shown in Table 1. In the exemplary experiment, the adhesion of ash and soot is shown in a value of relative ratio where the amount of ash and soot adhering to the base material of the first comparative example is 1. The corrosion resistance is shown in a value of relative ratio where the degree of corrosion of the base material of the first comparative example is 1.

TABLE 1

| | FIRST COMPARATIVE EXAMPLE | FIRST EXEMPLARY EXPERIMENT |
|---|---|---|
| ADHESION OF ASH AND SOOT | 1 | 0.1 |
| CORROSION RESISTANCE | 1 | 6 |

As shown in Table 1, the adhesion of ash, soot, or the like adhering to the base material of the first exemplary experiment is about a tenth of that of the first comparative example, which means, reduction of about 90% is achieved for the first exemplary experiment compared to the first comparative example. The corrosion resistance of the base material of the first exemplary experiment is about a sixth of the first comparative example.

Consequently, by providing the steel covering layer 10B according to the embodiment on the base material as in the first exemplary experiment, the reducing effect of adhesion of ash, soot, or the like can be improved by about 10 times compared to the case with solely the base material, and at the same time, the corrosion resistance can be improved by about six times compared to the case with solely the base material Therefore, since the steel covering layer 10B according to the embodiment is formed in the two-layer structure in which the binder layer 21 is formed between the heat transfer tube 11 and the surface layer 12, adhesion of ash, soot, or the like to the surface of the steel covering layer 10B according to the embodiment as well as corrosion of the heat transfer tube 11 can be suppressed.

As illustrated in FIG. 4, when a great number of heat transfer tubes provided in a shell, of a heat exchanger are used without any treatment as in the prior art, the great amount of ash and soot included in the flue gas 15 adheres to the front surface, opposing the flow direction, of the heat transfer tube 11 in the forward stage. This causes adhesion of ash and soot included in the flue gas 15 to the heat transfer tubes 11 provided in the downstream stages, thereby causing deterioration in heat transfer efficiency of the whole heat transfer tubes 11, which results in deterioration in the heat exchanging efficiency of the whole heat exchanger.

Contrarily, when the steel covering layer 10B according to the embodiment is provided on the surface of the heat transfer tube 11, the adhesion of ash, soot, or the like to the surface of the steel covering layer 10B according to the embodiment as well as corrosion of the heat transfer tube 11 can be suppressed, thereby suppressing deterioration in heat transfer efficiency of the heat transfer tube 11 as well as degrading of the heat transfer tube 11. In this manner, the deterioration in the heat exchanging efficiency of the whole heat transfer tubes 11 can be suppressed and the heat transfer efficiency can be maintained, allowing stable operation of the heat exchanger.

In each of the embodiments described above, description is made for the case in which the present invention is applied to the heat transfer tube 11 provided in the fin-tube heat exchanger. However, it is not limited to the configuration. The present invention may be applied to a heat exchanger such as an air cooling heat exchanger and a direct contact heat exchanger using gas-liquid contact. The steel covering layers 10A and 10B according to the embodiment are not limited to the application to heat exchangers using gas-liquid contact, and may be applied to heat exchangers using liquid-liquid contact or heat exchangers using gas-gas contact. Examples of liquid-liquid contact heat exchangers include spiral heat exchangers, plate-type heat exchangers, double-pipe heat exchangers, shell-and tube-type heat exchangers, spiral tube heat exchangers, spiral plate heat exchangers, tank with coil heat exchangers, jacketed vessel heat exchangers, and liquid-liquid direct contact heat exchangers. Examples of gas-gas contact heat exchangers include static type heat exchangers, rotary regenerative heat exchangers, periodic-flow regenerative heat exchangers, and vortex-tubes.

In the embodiment, description is made for the case when the present invention is applied to heat exchangers. However, the present invention is not limited to the configuration, and can similarly be applied to steels and steel structures used under severe environments such as polluted air and corrosive atmosphere.

REFERENCE SIGNS LIST 10A, 10B STEEL COVERING LAYER
11 HEAT TRANSFER TUBE
12 SURFACE LAYER
13 PRIMER LAYER
15 FLUE GAS
16 DEPOSIT
21 BINDER LAYER

The invention claimed is:

1. A steel covering layer formed on a surface of each of a group of heat transfer tubes comprising:
    a surface layer formed of at least one selected from a group of silicone resin compositions and fluoro resin compositions above the surface of each of the group of heat transfer tubes, the group of heat transfer tubes being provided in a shell of a heat exchanger in multiple stages opposing a flow direction of a flue gas of the heat exchanger, the surface layer being formed at least on the surface of upstream side in the flow direction of the flue gas above the surface of each of the group of heat transfer tubes: and
    a binder layer provided between each of the group of heat transfer tubes and each of the surface layer, the binder layer formed of a film and containing a glass coating agent composed of a Si—0 structure,
    wherein the surface layer is a monomolecular film with a thickness ranging from more than or equal to 10 nm to less than 1 μm, and the glass coating agent forms a covalent bond by dehydration reaction with an OH group on the surface of each of the group of heat transfer tubes.

2. The steel covering layer according to claim 1, wherein the binder layer has a thickness in a range from 5 μm to 100 μm.

3. The steel covering layer according to claim 2, wherein a thickness of the binder layer and the surface layer is 10 μm or less.

4. The steel covering layer according to claim 1, wherein the surface layer includes at least one of a $(CH_4)_3$—Si structure, a $F_3C$ structure, and a silane coupling reactive group.

5. A method of surface treatment of a group of heat transfer tubes comprising:
    forming a binder layer on a surface of each of the group of the heat transfer tubes provided in a shell of a heat exchanger in multiple stages opposing a flow direction of a flue gas of the heat exchanger, the binder layer being formed at least upstream side in the flow direction of the flue gas on the surface of each of the group of heat transfer tubes, the binder layer formed of a film and containing a glass coating agent composed of a Si—O structure;

applying a solution including at least one selected from a group of silicone resin compositions and fluoro resin compositions to the surface of the heat transfer tube; and performing heat treatment to cure the solution to form a surface layer above the surface of each of the group of heat transfer tubes with the binder layer interposed therebetween, wherein the surface layer is a monomolecular film with a thickness ranging from more than or equal to 10 nm to less than 1 µm, and the glass coating agent forms a covalent bond by dehydration reaction with an OH group on the surface of each of the group of heat transfer tubes.

6. The method of surface treatment of a heat transfer tube according to claim 5, wherein the binder layer has a thickness in a range from 5 µm to 100 µm.

7. The method of surface treatment of a heat transfer tube according to claim 6, wherein a thickness of the binder layer and the surface layer is 10 µm or less.

8. The method of surface treatment of a heat transfer tube according to claim 5, wherein the surface layer includes at least one of a $(CH_4)_3$—Si structure, a $F_3C$ structure, and a silane coupling reactive group.

* * * * *